US006823473B2

(12) United States Patent
Mukherjee

(10) Patent No.: US 6,823,473 B2
(45) Date of Patent: Nov. 23, 2004

(54) SIMULTANEOUS AND REDUNDANTLY THREADED PROCESSOR UNCACHED LOAD ADDRESS COMPARATOR AND DATA VALUE REPLICATION CIRCUIT

(75) Inventor: Shubhendu S. Mukherjee, Framingham, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 618 days.

(21) Appl. No.: 09/839,626

(22) Filed: Apr. 19, 2001

(65) Prior Publication Data

US 2001/0034854 A1 Oct. 25, 2001

Related U.S. Application Data

(60) Provisional application No. 60/198,530, filed on Apr. 19, 2000.

(51) Int. Cl.[7] .................................................. G06F 11/00
(52) U.S. Cl. ............................ 714/10; 714/47; 714/51; 714/2; 714/53; 712/227; 712/235
(58) Field of Search ............................ 714/5, 2, 10, 47, 714/51, 227, 235, 228, 53

(56) References Cited

U.S. PATENT DOCUMENTS

| | | | | |
|---|---|---|---|---|
| 5,758,142 | A | | 5/1998 | McFarling et al. .......... 395/586 |
| 5,933,860 | A | | 8/1999 | Emer et al. ................. 711/213 |
| 6,334,184 | B1 | * | 12/2001 | Dhong et al. ............... 712/235 |
| 6,523,139 | B1 | * | 2/2003 | Banning et al. .............. 714/43 |
| 6,668,317 | B1 | * | 12/2003 | Bernstein et al. ........... 712/245 |
| 2001/0034824 | A1 | * | 10/2001 | Mukherjee et al. ......... 712/215 |

OTHER PUBLICATIONS

*AR–SMT: Microarchitectural Approach To Fault Tolerance In Microprocessors,* Eric Rotenberg, (8 p.).
*DIVA: A Dynamic Approach To Microprocessor Verification,* Todd M. Austin, Journal of Instruction–Level Parallelism 2 (2000) 1–6, Submitted Feb. 2000; published May 2000 (26 p.).
*DIVA: A Reliable Substrate For Deep Submicron Microarchitecture Design,* Todd M. Austin, May/Jun. 1999 (12 p.).
M. Franklin, "Incorporating Fault Tolerance in Superscalar Processors," Proceedings of High Performance Computing, Dec., 1996.

(List continued on next page.)

*Primary Examiner*—Scott Baderman
*Assistant Examiner*—Anne L. Damiano

(57) ABSTRACT

A simultaneous and redundantly threaded, pipelined processor executes the same set of instructions simultaneously as two separate threads to provide fault tolerance. One thread is processed ahead of the other thread so that the instructions in one thread are processed through the processor's pipeline ahead of the corresponding instructions from the other thread. The thread, whose instructions are processed earlier, places its uncached reads in a read queue. Subsequently, the second thread places its uncached reads in the read queue. A compare circuit periodically scans the read queue for matching uncached read instructions. If otherwise matching instructions differ in their target address, then a fault has occurred in the processing and the compare circuits initiates fault recovery. If comparison of the two instructions reveals they are identical, the compare circuit allows only a single uncached read instruction to pass to the system main memory. The data returned from the uncached read is replicated and passed to each thread. In this way, transient faults are detected with a minimum amount of hardware overhead and independent of differences in the actual order of program execution or differences in branch speculation.

24 Claims, 2 Drawing Sheets

OTHER PUBLICATIONS

A. Mahmood et al., "Concurrent Error Detection Using Watchdog Processors—A Survey," IEEE Trans. on Computers, 37(2):160–174, Feb. 1988.

J. H. Patel et al., "Concurrent Error Detection In ALU's by Recomputing With Shifted Operands," IEEE Trans. on Computers, 31(7):589–595, Jul. 1982.

D. A. Reynolds et al., "Fault Detection Capabilities Of Alternating Logic," IEEE Trans. on Computers, 27(12):1093–1098, Dec. 1978.

E. Rotenberg et al., "Trace Cache: A Low Latency Approach To High Bandwidth Instruction Fetching," Proceedings of the 29th Annual International Symposium on Microarchitecture, pp. 24–34, Dec. 1996.

E. Rotenberg et al., "Trace Processors," 30th Annual International Symposium on Microarchitecture (MICRO–30), Dec. 1997.

T. J. Slegel et al., "IBM's S/390 G5 Microprocessor Design," IEEE Micro, pp. 12–23, Mar./Apr. 1999.

J. E. Smith et al., "Implementing Precise Interrupts In Pipelined Processors," IEEE Trans. on Computers, 37(5):562–573, May 1988.

G. S. Sohi et al., "A Study Of Time–Redundant Fault Tolerance Techniques For High–Performance Pipelined Computers," Digest of Papers, 19th International Symposium on Fault–Tolerant Computing, pp. 436–443, 1989.

G. S. Sohi et al., "Instruction Issue Logic For High–Performance, Interruptible, Multiple Functional Unit, Pipelined Computers," IEEE Transactions on Computers, 39(3):349–359, Mar. 1990.

D. M. Tullsen et al., "Simultaneous Multithreading Maximizing On–Chip Parallelism," Proceedings of the 22nd Annual International Symposium on Computer Architecture, Italy, Jun. 1995.

D. Tullsen et al., "Exploiting Choice: Instruction Fetch And Issue On An Implementable Simultaneous Multithreading Processor," Proceedings of the 23rd Annual International Symposium on Computer Architecture (ISCA), May, 1996.

S. K. Reinhardt et al., "Transient Fault Detection Via Simultaneous Multitreading" (12 p.).

L. Spainhower et al., "IBM S/390 Parallel Enterprise Server G5 Fault Tolorance: A Historical Perspective," IBM J. Res. Develop. vol. 43, No. 5/6, Sep./Nov. 1999, pp. 863–873.

M. Franklin, "A Study Of Time Redundant Fault Tolerance Techniques For Superscalar Processors" (5 p.).

K. Sundaramoorthy et al., "Slipstream Processors: Improving Both Performance And Fault Tolerance" (6 p.).

* cited by examiner

SIMULTANEOUS AND REDUNDANTLY THREADED PROCESSOR UNCACHED LOAD ADDRESS COMPARATOR AND DATA VALUE REPLICATION CIRCUIT

CROSS-REFERENCE TO RELATED APPLICATIONS

This application is a non-provisional application claiming priority from provisional application Ser. No. 60/198,530, filed on Apr. 19, 2000, entitled "Transient Fault Detection Via Simultaneous Multithreading," the teachings of which are incorporated by reference herein as if reproduced in full below.

This application also relates to application Ser. No. 09/584,034, filed May 30, 2000, entitled "Slack Fetch to Improve Performance in a Simultaneous and Redundantly Threaded Processor," the teachings of which are incorporated by reference herein as if reproduced in fill below.

This application also relates to application Ser. No. 09/837,995, entitled "Simultaneous and Redundantly Threaded Processor Store Instruction Comparator," filed concurrently herewith, the teachings of which are incorporated by reference herein as if reproduced in full below.

This application also relates to application Ser. No. 09/838,078, entitled "Cycle Count Replication in a Simultaneous and Redundantly Threaded Processor," filed concurrently herewith, the teachings of which are incorporated by reference herein as if reproduced in full below.

This application also relates to application Ser. No. 09/839,621, now U.S. Pat. No. 6,598,122, entitled "Active Load Address Buffer," filed Apr. 19, 2001, the teachings of which are incorporated by reference herein as if reproduced in full below.

This application also relates to application Ser. No. 09/838,078, entitled "Simultaneous and Redundantly Threaded Processor Branch Outcome Queue," filed concurrently herewith, the teachings of which are incorporated by reference herein as if reproduced in full below.

This application also relates to application Ser. No. 09/838,069, entitled "Input Replicator for Interrupts in a Simultaneous and Redundantly Threaded Processor," filed concurrently herewith, the teachings of which are incorporated by reference herein as if reproduced in full below.

This application also relates to application Ser. No. 09/839,624, entitled "Load Value Queue Replication in a Simultaneous and Redundantly Threaded Processor," filed concurrently herewith, the teachings of which are incorporated by reference herein as if reproduced in full below.

STATEMENT REGARDING FEDERALLY SPONSORED RESEARCH OR DEVELOPMENT

Not applicable.

BACKGROUND OF THE INVENTION

1. Field of the Invention

The present invention relates generally to microprocessors. More particularly, the present invention relates to a pipelined, simultaneously and redundantly threaded processor adapted to execute the same instruction set in at least two separate threads for transient fault detection purposes. More particularly still, the invention relates to detecting transient faults between the multiple processor threads by comparison of their uncached load requests, and a data value replication system for insuring each thread receives the same uncached load data value.

2. Background of the Invention

Solid state electronics, such as microprocessors, are susceptible to transient hardware faults. For example, cosmic radiation can alter the voltage levels that represent data values in microprocessors, which typically include tens or hundreds of thousands of transistors. The changed voltage levels change the state of individual transistors, causing faulty operation. Faults caused by cosmic radiation typically are temporary and the transistors eventually operate normally again. The frequency of such transient faults is relatively low—typically less than one fault per year per thousand computers. Because of this relatively low failure rate, making computers fault tolerant currently is attractive more for mission-critical applications, such as online transaction processing and the space program, than computers used by average consumers. However, future microprocessors will be more prone to transient fault due to their smaller anticipated size, reduced voltage levels, higher transistor count, and reduced noise margins. Accordingly, even low-end personal computers benefit from being able to protect against such faults.

One way to protect solid state electronics from faults resulting from cosmic radiation is to surround the potentially effected electronics by a sufficient amount of concrete. It has been calculated that the energy flux of the cosmic radiation can be reduced to acceptable levels with at least six feet of concrete surrounding the chips to be protected. For obvious reasons, protecting electronics from faults caused by cosmic radiation with six feet of concrete usually is not feasible as computers are usually placed in buildings that have already been constructed without this amount of concrete. Because of the relatively low occurrence rate, other techniques for protecting microprocessors from faults created by cosmic radiation have been suggested or implemented that merely check for and correct the transient failures when they occur.

Rather than attempting to create an impenetrable barrier through which cosmic rays cannot pierce, it is generally more economically feasible and otherwise more desirable to provide the effected electronics with a way to detect and recover from faults caused by cosmic radiation. In this manner, a cosmic ray may still impact the device and cause a fault, but the device or system in which the device resides can detect and recover from the fault. This disclosure focuses on enabling microprocessors (referred to throughout this disclosure simply as "processors") to recover from a fault condition.

One technique for detecting transient faults is implemented in the Compaq Himalaya system. This technique includes two identical "lockstepped" microprocessors that have their clock cycles synchronized, and both processors are provided with identical inputs (i.e., the same instructions to execute, the same data, etc.). In the Compaq Himalaya system, each input to the processors, and each output from the processors, is verified and checked for any indication of a transient fault. That is, the hardware of the Himalaya system verifies all signals going to and leaving the Himalaya processors at the hardware signal level—the voltage levels on each conductor of each bus are compared. The hardware performing these checks and verifications is not concerned with the particular type of instruction it is comparing; rather, it is only concerned that two digital signals match. Thus, there is significant hardware and spatial overhead associated with performing transient fault detection by lockstepping duplicate processors in this manner.

The latest generation of high-speed processors achieve some of their processing speed advantage through the use of a "pipeline." A "pipelined" processor includes a series of units (e.g., fetch unit, decode unit, execution units, etc.), arranged so that several units can simultaneously process an appropriate part of several instructions. Thus, while one instruction is decoded, an earlier fetched instruction is executed. These instructions may come from one or more threads. Thus, a "simultaneous multithreaded" ("SMT") processor permits instructions from two or more different program threads (e.g., applications) to be processed simultaneously. However, it is possible to cycle lockstep the threads of an SMT processor to achieve fault tolerance.

An SMT processor can be modified so that the same program is simultaneously executed in two separate threads to provide fault tolerance within a single processor. Such a processor is called a simultaneous and redundantly threaded ("SRT") processor. Some of the modifications to turn a lockstep SMT processor into an SRT processor are described in Provisional Application Ser. No. 60/198,530. However, to utilize known transient fault detection requires that each thread of the SRT processor be lockstepped (as opposed to having two SRT processors lockstepped to each other). Hardware within the processor itself (in the Himalaya, the hardware is external to each processor) must verify the digital signals on each conductor of each bus. While increasing processor performance and yet still doing transient fault protection in this manner may have advantages over previous fault detecting systems, SRT processor performance can be enhanced.

One such performance enhancing technique is to allow each processor to run independently. More particularly, one thread is allowed to execute program instructions ahead of the second thread. In this way, memory fetches and branch speculations resolve ahead of time for the trailing thread. However, verifying, at the signal level, each input and output of each thread becomes complicated when the threads are not lockstepped (executing the same instruction at the same time).

A second performance enhancing technique for pipelined computers is an "out-of-order" processor. In an out-of-order processor each thread need not execute the program in the order it is presented; but rather, each thread may execute program steps out of sequence. The technique of fault tolerance by verifying bus voltage patterns between the two threads becomes increasingly difficult when each thread is capable of out-of-order processing. The problem is further exacerbated if the one processor thread leads in overall processing location within the executed program. In this situation not only would the leading thread be ahead, but this thread may also execute the instructions encountered in a different sequence than the trailing thread.

The final performance enhancing technique of SRT processor is speculative branch execution. In speculative branch execution a processor effectively guesses the outcome of a branch in the program thread and executes subsequent steps based on that speculation. If the speculation was correct, the processor saves significant time (for example, over stalling until the branch decision is resolved). In the case of an SRT processor it is possible that each thread makes speculative branch execution different than the other. Thus, it is impossible to do transient fault protection using known techniques—verifying digital signals on each bus—because it is possible there may be no corresponding signal between two threads.

What is needed is an SRT processor that can achieve performance gains over an SRT processor in which each thread is lockstepped by using the performance enhancing techniques noted above, and that can also do transient fault detection.

BRIEF SUMMARY OF THE INVENTION

The problems noted above are solved in large part by a simultaneous and redundantly threaded processor that has performance gains over an SRT processor with lockstepped threads and provides transient fault tolerance. The processor checks for transient faults by checking only memory requests (input/output ("I/O") commands, I/O requests) that directly or indirectly affect data values in system memory. More particularly, the preferred embodiments verify only writes (stores) that change data outside the bounds of the processor and uncached reads, e.g., a read from a virtual address space mapped to an I/O device. Because this transient fault detection does not need to verify every input and output at the signal level, the transient fault protection extends to the threaded "out-of-order" processors, processors whose threads perform independent speculative branch execution, and processors with leading and lagging thread execution.

An embodiment of the invention comprises a read queue and a compare circuit. The processor thread executing the program ahead, the leading thread, writes its uncached read to the read queue. Subsequently, the processor thread lagging or trailing, the trailing thread, writes its corresponding uncached read or uncached data load request to the queue. A compare circuit periodically scans the read queue looking for the corresponding uncached reads. If the address of the corresponding uncached reads match exactly, then each of the processor threads have operated without fault, and the read is allowed to execute. However, if any differences exist in the address of the uncached reads, the compare circuit initiates a fault recovery sequence.

The preferred embodiment further comprises a data value replication circuit that captures the result of the uncached read, the return data, and replicates that data for use by each of the threads. This insures that each thread uses the same input value in further processing to avoid a later misdiagnosis of a transient fault.

Alternatively, a second embodiment of the invention comprises the read queue into which the leading thread places its uncached read. As the trailing thread reaches this point in the program execution, hardware and firmware associated with that thread compares the uncached read, without placing that uncached read in the same queue as the previous uncached read, and finds the corresponding uncached load from the leading thread. If these two uncached reads match exactly, the uncached read placed in the queue is marked as verified and the trailing thread read is effectively discarded. The verified uncached read is then sent to its appropriate location in the cache or main memory areas.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, microprocessor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
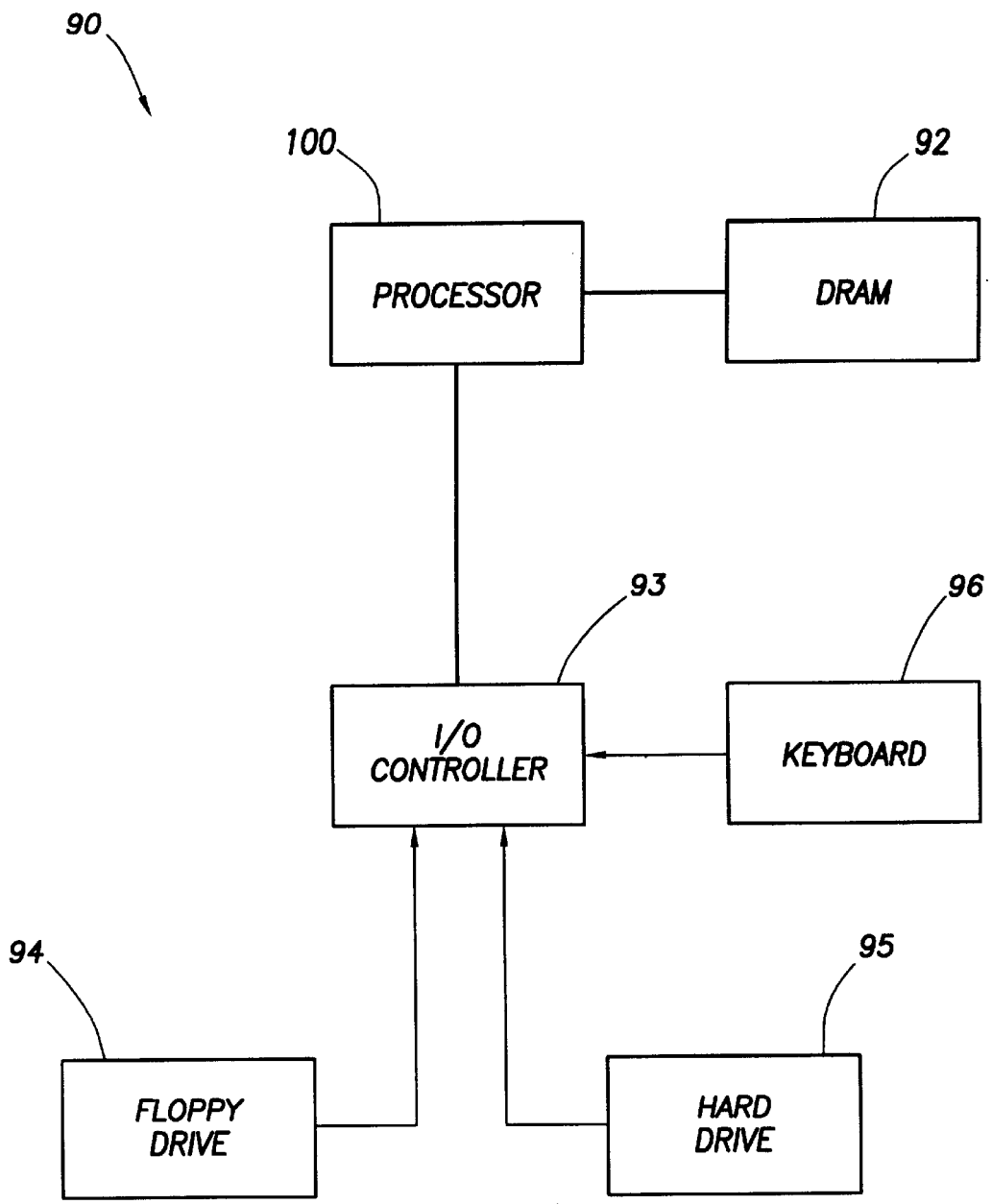
FIG. 1 is a diagram of a computer system constructed in accordance with a preferred embodiment of the invention and including a simultaneous and redundantly threaded processor.

FIG. 1 shows a computer system 90 including a pipelined, simultaneous and redundantly threaded ("SRT") processor 100 constructed in accordance with a preferred embodiment of the invention. Besides processor 100, computer system 90 also preferably includes a system main memory in the form of dynamic random access memory ("DRAM") 92, an input/output ("I/O") controller 93, and various I/O devices which may include a floppy drive 94, a hard drive 95, a keyboard 96, and the like. The I/O devices may also have on-board memory, and this memory and system main memory make up the system memory. The I/O controller 93 provides an interface between processor 100 and the various I/O devices 94–96. The DRAM 92 can be any suitable type of memory devices such as RAMBUS™ memory. In addition, SRT processor 100 may also be coupled to other SRT processors if desired in a commonly known "Manhattan" grid, or other suitable architecture.

Figure 2:
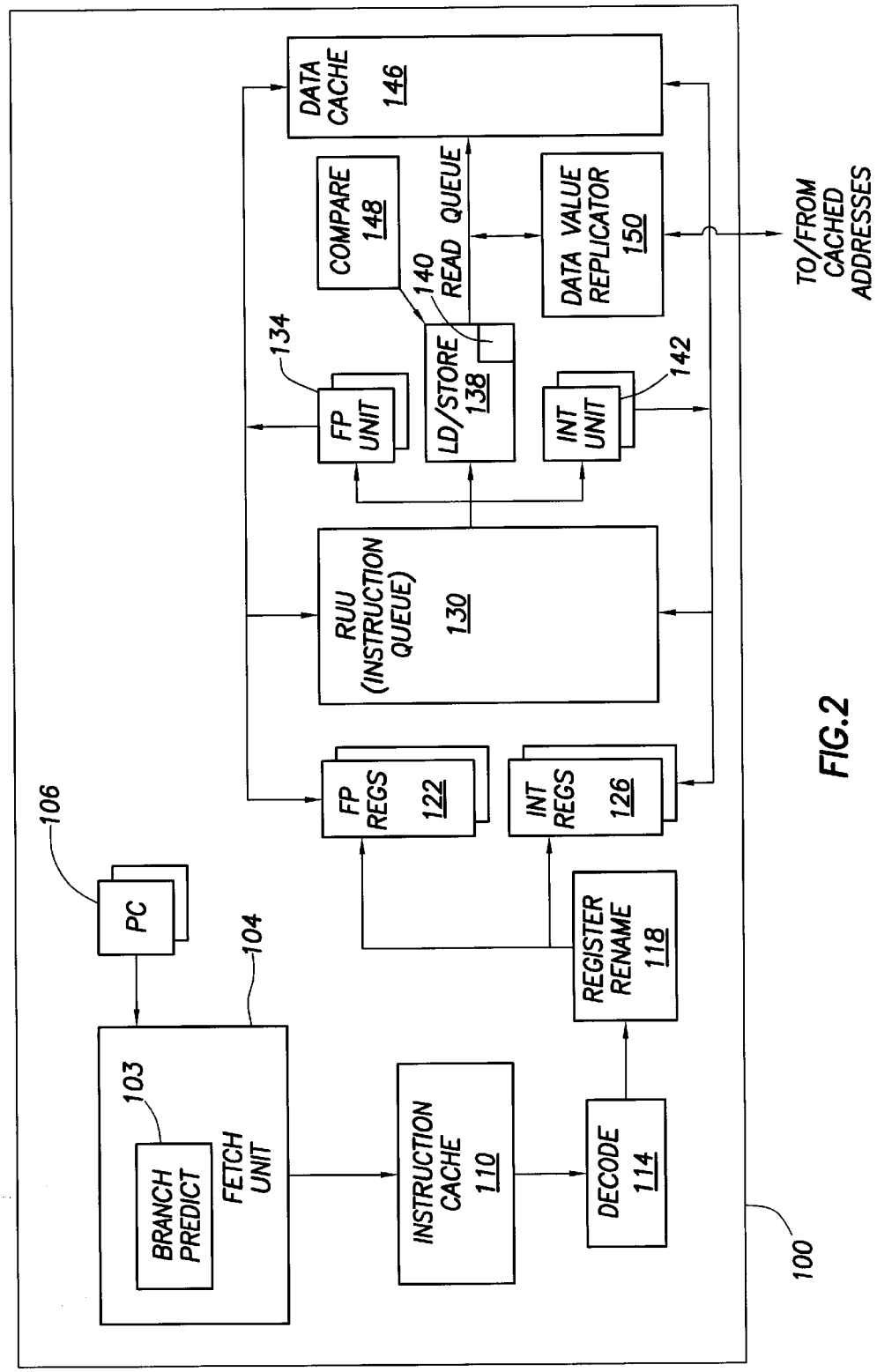
FIG. 2 is a block diagram of the simultaneous and redundantly threaded processor from FIG. 1 in accordance with a preferred embodiment that includes a read queue and a compare circuit to check for transient faults manifested in differences in uncached read requests.

FIG. 2 shows the SRT processor 100 of FIG. 1 in greater detail. Referring to FIG. 2, processor 100 preferably comprises a pipelined architecture which includes a series of functional units, arranged so that several units can be simultaneously processing appropriate parts of several instructions. Fetch unit 102 uses a program counter 106 for assistance as to which instruction to fetch. Being a multi-threaded processor, the fetch unit 102 preferably can simultaneously fetch instructions for multiple thread execution. A separate program counter 106 is associated with each thread. Each program counter 106 is a register that contains the address of the next instruction to be fetched from the corresponding thread by the fetch unit 102. FIG. 2 shows two program counters 106 to permit the simultaneous fetching of instructions from two threads. It should be recognized, however, that additional program counters can be provided to fetch instructions from more than two threads simultaneously.

Fetch unit 102 includes branch prediction logic 103 which permits the fetch unit 102 to speculate ahead on branch instructions. In order to keep the pipeline full (which is desirable for efficient operation), the branch predictor logic 103 speculates the outcome of a branch instruction before the branch instruction is actually executed. Branch predictor 103 generally bases its speculation on previous instructions. Any suitable speculation algorithm can be used in branch predictor 103. Also, each thread preferably has its own branch prediction unit 103 (not shown).

Referring still to FIG. 2, instruction cache 110 preferably provides a temporary storage buffer for the instructions to be executed. Decode logic 114 preferably retrieves the instructions from instruction cache 110 and determines the type of each instruction (e.g., add, subtract, load, store, etc.). Decoded instructions are then preferably passed to the register rename logic 118, which maps logical registers onto a pool of physical registers.

The register update unit ("RUU") 130 provides an instruction queue for the instructions to be executed. The RUU 130 serves as a combination of global reservation station pool, rename register file, and reorder buffer.

The floating point register 122 and integer register 126 are used for the execution of instructions that require the use of such registers as is known by those of ordinary skill in the art. These registers 122, 126 can be loaded with data from the data cache 146. The registers also provide their contents to the RUU 130. FIG. 2 shows two sets of floating point registers 122 and integer registers 126 for a two-thread processor. However, each thread of the microprocessor preferably has its own set of floating point registers 122 and integer registers 126, thus multiple sets of these registers may be present, depending on the number of threads of the processor.

The execution units 134, 138, and 142 comprise a floating point execution unit 134, a load/store execution unit 138, and an integer execution unit 142. Each execution unit performs the operation specified by the corresponding instruction type. Accordingly, the floating point execution units 134 execute floating instructions such as multiply and divide instruction while the integer execution units 142 execute integer-based instructions. The load/store units 138 perform load operations in which data from memory is loaded into a register 122 or 126. The load/store units 138 also perform store operations in which data from registers 122, 126 is written to data cache 146 and/or DRAM memory 92 (FIG. 1). Operation of the load/store units 138 of the preferred embodiments are discussed more fully below.

Numerous modifications can be made from that shown in FIG. 2. For example, the locations of the RUU 130 and registers 122, 126 can be reversed if desired. For additional information, the following references, all of which are incorporated herein by reference, may be consulted for additional information if needed: U.S. patent application Ser. No. 08/775,553, filed Dec. 31, 1996, and "Exploiting Choice: Instruction Fetch and Issue on an Implementable Simultaneous Multithreaded Processor," by D. Tullsen, S. Eggers, J. Emer, H. Levy, J. Lo and R. Stamm, Proceedings of the $23^{rd}$ Annual International Symposium on Computer Architecture, Philadelphia, Pa; May 1996.

The preferred embodiments the invention provides system designers the ability to design a performance enhanced SRT processor, and yet still perform transient fault detection without severe penalties in additional components and size of the processor. The preferred SRT processor 100 is capable of processing instructions from two different threads simultaneously. More particularly, an SRT processor of an embodiment preferably executes the same program in each thread, however, one thread leads the program execution, the leading thread, and likewise the second thread trails the program execution, the trailing thread. Performance gains over an SRT processor with lockstepped threads are realized in having data reads and branch predictions already resolved before the second thread reaches the program execution stages where those pieces of information are requested or need to be known. For further information on an embodiment to achieve these performance gains, see co-pending application Ser. No. 09/584,034 titled "Slack Fetch To Improve Performance in Simultaneous and Redundantly Threaded Processor," filed May 30, 2000. Processing the same program through the processor in two different threads permits the processor to detect transient faults caused by cosmic radiation as noted above.

Transient fault detection is accomplished in the preferred embodiments by checking or verifying only particular commands before they cross the boundary of the processor into the rest of the computer system. More particularly, the SRT processor only verifies memory requests that change values in main memory, either directly (such as by a direct write) or indirectly (such as by a read from an input/output device). More particularly still, and referring to FIG. 2, an embodiment comprises a read queue 140 and a compare circuit 148. The leading thread of the SRT processor preferably writes its uncached reads to the read queue 140. An uncached read is a memory read request from a portion of memory that is designated as not cacheable. In the virtual address space of a computer, a certain portion is designated as cacheable. Blocks of data in the cacheable disk space, when read, are placed in the microprocessor's data cache. By contrast, blocks of data in the non-cacheable virtual address space may be read, but those data values are not placed in the microprocessor's cache. For example, a network interface card ("NIC") may have a certain amount of random access memory on the card itself. By mapping of the virtual address space, portions may be mapped to the memory that physically resides on the network interface card. The processor that reads or writes to that virtual memory address does not necessary know where that information physically resides. Uncached data addresses are so designated because the data block in the physical memory is subject to change. In the exemplary case of a NIC card, a read from a NIC card is an implicit instruction for that card to retrieve more information from the network and place it at the location just read. Thus, if a processor reads from the virtual address space that maps to the memory of a NIC card, the data block read from the physical memory on the NIC card may change as a result of the data read. Thus, it is seen that types of data blocks such as these cannot be cached, as discrepancies between the cache version (if done) and the physical memory version are likely to occur. Thus, an uncached read request is a request to read a block of data from a portion of the virtual address space that is designated as non-cacheable. Other input/output devices have the similar constraints, e.g., hard drives and disk drives.

Thus, the leading thread preferably writes its uncached read request to the buffer or read queue 140. However, the read does not execute upon its initial insertion in the read queue 140. Rather, the uncached read waits in the queue for the trailing thread to reach that point in the program execution. When the trailing thread reaches that point, it preferably writes its uncached read to the read queue 140. In the situation where each of the threads places their uncached read into the read queue 140, the compare circuit 148 performs checking and verification.

Compare circuit 148 preferably periodically scans the content of the read queue 140. Compare circuit 148 looks for matching uncached read requests. More particularly, the compare circuit 148 preferably compares address from each related uncached read request from each thread. If these reads from each thread match exactly (their addresses are exactly the same), then only one of those uncached reads is allowed to proceed to read from main memory. As alluded to above, if both uncached reads were allowed to execute, it is possible that each thread would receive a different block of data, even reading the same memory address. To ensure that each thread receives the same uncached read data, the processor 100 preferably includes an uncached read data value replication circuit 150, which is discussed more thoroughly below.

If, however, the compare circuit 148 determines that corresponding uncached reads are different in some respect, then a transient fault has occurred. That is, if the program counter or address of corresponding uncached reads are different, then a transient fault has occurred in one of the processor threads. In this situation, the compare circuit 148 preferably initiates a fault recovery scheme. This fault recovery scheme preferably includes restarting each of the microprocessor threads at a point in the program before the fault occurred.

In a second embodiment of the invention, the trailing thread has sufficient hardware and firmware to perform the verification of the uncached read itself. In this second embodiment, the leading thread writes its uncached read to the read queue 140. At some time thereafter, the trailing thread generates its corresponding uncached read and, rather than simply placing it in the read queue 140 and continuing on, the trailing thread logic scans the read queue 140 for the corresponding read request. If the address of the uncached read previously written by the leading thread exactly matches the uncached read generated by the trailing thread, the leading thread read in the read buffer 140 is validated, for example, by setting a valid bit within the queue, and the load/store unit 138 therefore executes the data read.

Thus, the transient fault protection of the preferred embodiments involve checking and verifying the committed stores and the uncached read requests. Co-pending application titled "Simultaneous and Redundantly Threaded Processor Store Instruction Comparator," Ser. No. 09/837,995, discusses the committed store aspect of the transient fault detection. However, a committed store, by virtue of what it is, does not require the return read of any information. An uncached read, by contrast, preferably returns the block of data requested. Because even back-to-back reads from the same uncached load address may result in different values being returned, there must be some mechanism for insuring that each thread of the processor receives the same block of data.

In the preferred embodiments, the mechanism for insuring that each thread receives the same uncached read value is the data value replication circuit 150, as shown in FIG. 2. Preferably the blocks of data returned from an uncached read couple to the data value replication circuit 150. Data returned to the data value replication circuit 150 is preferably itself protected from transient faults, by known forms such as parity bits or error correction codes. This data value replicator takes the uncached read data, and duplicates that data for return to each thread. Architecturally, the duplication of data for each thread could have many forms. For example, the uncached read data could be returned to the load/store unit and then the RUU 130 for immediate execution. Likewise, in the case where the returned data is not immediately needed, the data value replicator 150 may pass that information to the load store unit 138, which then may pass the information to one of the register units, for example, the integer registers 126. Thus, uncached read data returns to the data value replication circuit 150 where it is copied or replicated and provided to each thread for further processing.

Accordingly, the preferred embodiment of the invention provides for transient fault detection of a SRT processor by comparing corresponding uncached reads. This transient fault detection scheme is independent of whether the single SRT processor has lockstepped threads, has leading and lagging thread execution, is capable of out-of-order processing or performs speculative branch execution. The above discussion is meant to be illustrative of the principles and various embodiments of the present invention. Numerous variations and modifications will become apparent to those skilled in the art once the above disclosure is fully appreciated. For example, although the embodiments discussed above describe a read queue in which at least one of the uncached reads are placed prior to verification, one of ordinary skill in the art could design many ways in which these two uncached reads are compared prior to their execution. That is to say, the compare circuit and read queue are only exemplary of the idea of verifying the uncached reads as a transient fault detection mechanism. Further, the read queue is disclosed to be within one of the load/store execution units 138; however, one of ordinary skill in the art, now understanding the principles described herein, could easily design a system where each load/store execution unit has a separate queue, and the compare circuit 148 scans each queue for matching requests. Further, the read queue could be outside of any particular load/store execution unit. It is intended that the following claims be interpreted to embrace these and other variations and modifications.

What is claimed is:

1. A computer system, comprising:
 a pipelined, simultaneous and redundantly threaded ("SRT") processor having at least two threads;
 a system memory coupled to said processor;
 wherein said SRT processor comprises
  a load/store execution unit having a read queue that stores memory requests submitted by the at least two threads, wherein the memory requests directly or indirectly change values in the system memory;
  a compare logic coupled to said load/store execution unit that scans the contents of said read queue for corresponding memory requests generated by the at least two threads, and verifies that each corresponding memory request matches; and
  wherein said compare logic, based on whether the corresponding memory requests match, performs one of allowing the memory request to execute, or initiating fault recovery.

2. The computer system as defined in claim 1 wherein said memory request further comprises a memory read request that requests return data from said system memory designated as non-cacheable.

3. The computer system as defined in claim 2 wherein the SRT processor further comprises:
 a data value replication circuit coupled to said system memory; and
 wherein said data value replication circuit receives the return data from the system memory, duplicates the return data, and returns the data to the at least two threads.

4. The computer system as defined in claim 1 wherein said system memory further comprises a system main memory and memory disposed within at least one I/O device.

5. The computer system as defined in claim 1 further comprising each of said threads of said processor performs speculative branch execution independently from the other.

6. A method of checking for transient faults in a pipelined, simultaneous and redundantly threaded processor having at least two threads, the method comprising verifying, as between the at least two threads, memory requests that directly or indirectly affect values in a system memory.

7. The method as defined in claim 6 further comprising:
 verifying at least data load requests from sources that are not cached; and
 duplicating return data of said data load request for use by each thread.

8. The method as defined in claim 7 wherein verifying data load requests from sources that are not cached further comprises verifying data load requests directed to memory in an input/output device.

9. The method as defined in claim 8 wherein verifying data load requests directed to an input/output device further comprises verifying data load requests directed to a network interface card.

10. The method as defined in claim 8 wherein verifying data reads from an input/output device further comprises verifying data load requests directed to a disk drive.

11. A method of detecting transient faults in a pipelined, simultaneous and redundantly threaded microprocessor having at least two threads, the method comprising:
 executing a program as a first thread;
 generating a first input/output command from said first thread;
 storing said first input/output command in a storage queue;
 executing the program as a second thread;
 generating a second input/output command from said second thread;
 storing said second input/output command in said storage queue;
 checking at least an address of said first input/output command against at least an address of said second input/output command in a compare logic; and
 allowing one of said first or second input/output commands to execute if the checking step shows those input/output commands are exactly the same.

12. The method as defined in claim 11 wherein the generating steps further comprise:
 generating a first uncached load command from said first thread; and
 generating a second uncached load command from said second thread.

13. The method as defined in claim 12 further comprising:
 receiving, in a data replication circuit, a set of return data responsive to execution of one of said first and second uncached load commands;
 replicating the set of return data; and
 returning the return data to each of the first and second threads.

14. The method as defined in claim 11 wherein executing the first and second threads further comprises executing the first thread a plurality of program steps ahead of the second thread.

15. The method as defined in claim 14 further comprising allowing each of the first and second threads to make speculative branch execution independent of the other.

16. The method as defined in claim 14 further comprising:
 allowing the first thread to execute program steps out of an order of the program;
 allowing the second thread to execute program steps out of the order of the program; and
 allowing each of the first and second threads to execute the program in a different order from each other.

17. A micro-processor comprising:
 a first pipeline executing a first program thread;
 a second pipeline executing a second program thread;
 a read queue coupled to each of said first and second pipelines;
 a compare circuit coupled to said read queue;

wherein each of said first and second program threads independently generates corresponding input/output requests, and each thread places those input/output requests in the read queue; and wherein said compare circuit detects transient faults in operation of said first and second pipeline by comparing only the input/output requests from each thread that affects data in memory outside the microprocessor.

18. The microprocessor as defined in claim 17 wherein the input/output requests further comprises memory read requests from a portion of a computer system memory that is not cached during reads.

19. A method of detecting transient faults in a pipelined, simultaneous and redundantly threaded microprocessor having at least two threads, the method comprising:

executing a program as a first thread;

generating a first input/output command from said first thread;

storing said first input/output command in a storage queue;

executing the program as a second thread;

generating a second input/output command from said second thread;

checking at least an address of said first input/output command against at least an address of said second input/output command; and allowing one of said first or second input/output commands to execute if checking shows those input/output commands are the same.

20. The method as defined in claim 19 wherein the generating steps further comprise:

generating a first uncached load command from said first thread; and generating a second uncached load command from said second thread.

21. The method as defined in claim 20 further comprising:

receiving, in a data replication circuit, a set of return data responsive to execution of one of said first and second uncached load commands;

replicating the set of return data; and returning the return data to each of the first and second threads.

22. The method as defined in claim 19 wherein executing the first and second threads further comprises executing the first thread a plurality of program steps ahead of the second thread.

23. The method as defined in claim 22 further comprising allowing each of the first and second threads to make speculative branch execution independent of the other.

24. The method as defined in claim 22 further comprising:

allowing the first thread to execute program steps out of an order of the program;

allowing the second thread to execute program steps out of the order of the program; and allowing each of the first and second threads to execute the program in a different order from each other.

* * * * *